Feb. 25, 1969 L. C. FOSTER 3,430,094

DISPLAY DEVICES

Filed Dec. 27, 1966

Inventor

Leigh Curtis Foster

By [signature]

Attorney

United States Patent Office 3,430,094

Patented Feb. 25, 1969

3,430,094

DISPLAY DEVICES

Leigh Curtis Foster, Atherton, Calif., assignor to Zenith Radio Corporation, Chicago, Ill., a corporation of Delaware Filed Dec. 27, 1966, Ser. No. 604,899
U.S. Cl. 315—13 8 Claims
Int. Cl. H01j 29/50, 31/00

ABSTRACT OF THE DISCLOSURE

A channel indicator for a television receiver is constructed within the picture tube and comprises a needle-shaped electrode in the field of the final anode of the tube to serve as a cold emitter of electrons. An electron lens focuses the emitted electrons to a mask which has opaque portions and electron transparent portions, the latter having the configuration of channel numerals. A deflection field deflects the focused electrons to the appropriate channel indicator and, therefore, the channel numeric is projected on the screen of the picture tube.

The present invention pertains to display devices. More particularly, it relates to an indicator system included within a cathode-ray tube. While the invention has application to a variety of display systems, it is conveniently appropriate for use in connection with a television receiver display and, therefore, is described herein in that connection.

Present day television receivers include a cathode-ray tube in which a beam of electrons are caused to scan an image raster upon a phosphor screen. The electron beam is modulated with the video intelligence. It is also quite commonplace in today's television receivers to include a device for indicating the channel to which the receiver is tuned. This device typically is associated directly with the tuning mechanism and includes a beam of light which is projected through an indicia-bearing disc and focused upon a small image screen. The indicia represents the different channel numbers and the mask is moved in correlation with operation of the tuning mechanism to align the appropriate channel number with the light beam. While such prior channel indicator systems operate generally satisfactorily, they suffer the disadvantage that the viewer must look at a place on the television receiver different from that of his primary viewpoint, the image screen, in order to discern which channel is under selection. Also, the displayed channel indication usually must be quite small since at least the majority of the front surface of the receiver cabinet is occupied by the picture tube screen. In fact, some television receivers have the image screen completely filling the front of the cabinet, leaving no room for a channel indicator.

It is, accordingly, a general object of the present invention to provide an indicator system whch overcomes the aforenoted deficiencies and disadvantages.

It is another object of the present invention to provide a new and improved indicator system particularly adaptable to television receiver channel-indication display.

A specific object of the present invention is to provide an indicator system which may be constructed as an integral part of a cathode-ray tube.

An indicator system in accordance with the present invention includes a cathode-ray tube having an envelope enclosing an image screen, means for projecting cathode-rays toward that screen and means for creating a high-positive-potential field for accelerating the cathode-rays. The indicator system includes means defining a needle-like point disposed in the high-potential field and having a potential sufficiently negative relative to the potential of the field to effect cold-emission of electrons from the point. A mask of electron-opaque material is disposed between the point and the image screen with the mask defining at least one electron-transparent region therethrough. Finally, the system includes means for creating between the point and the mask a field selectively variable to move electrons emitted from the point to and away from the transparent region.

The features of the present invention which are believed to be novel are set forth with particularity in the appended claims. The manner and organization of operation of the invention, together with further objects and advantages thereof, may be understood by reference to the following description taken in connection with the accompanying drawing, in the several figures of which like reference numerals identify like elements and in which:

Figures 1, 2, 3, 4:
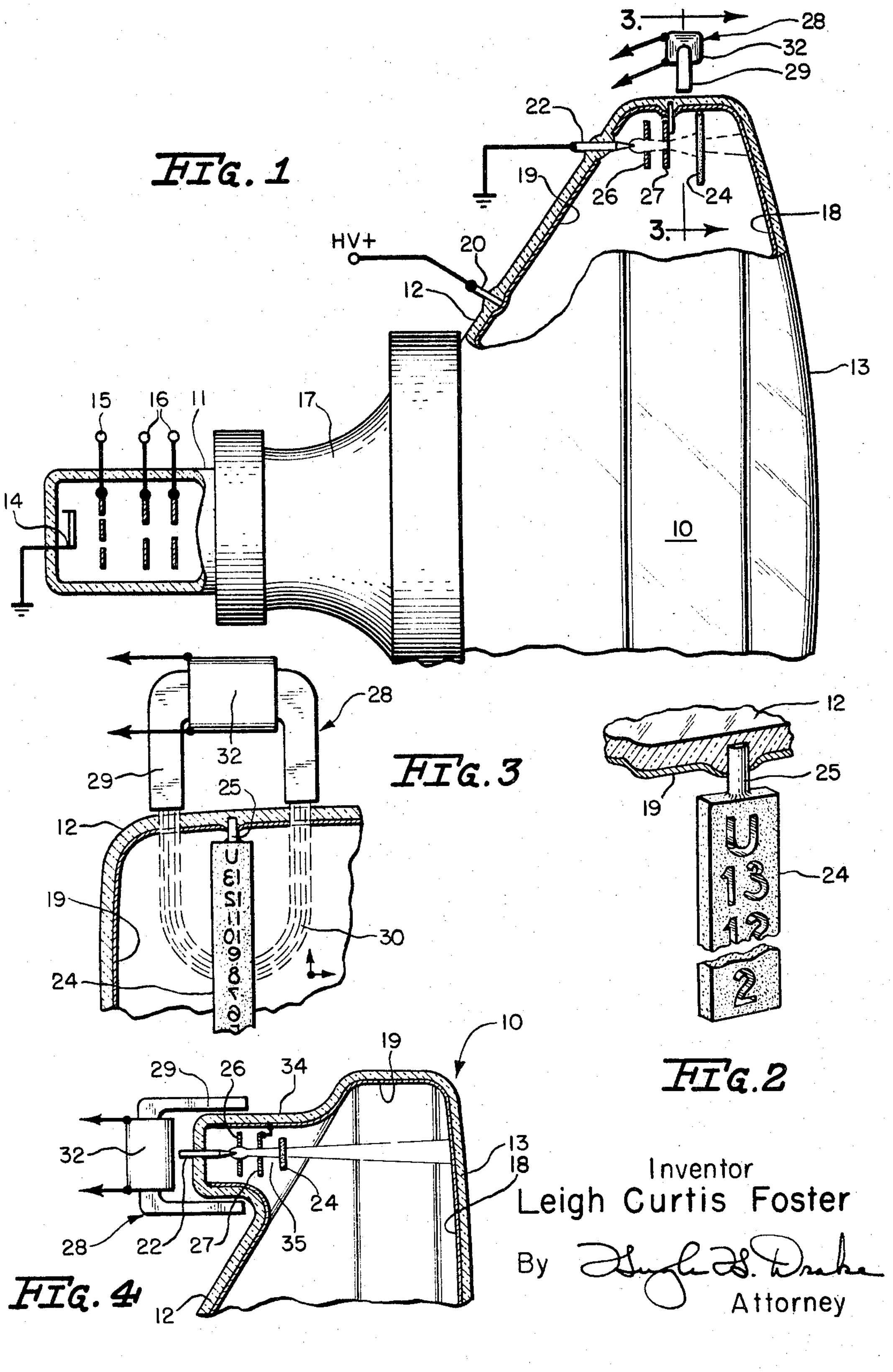
FIGURE 1 is a diagrammatic cross-sectional view of one embodiment of the present invention.
FIGURE 2 is an enlarged fragmentary perspective view of a portion of the apparatus illustrated in FIGURE 1.
FIGURE 3 is an enlarged fragmentary cross-sectional view taken along lines 3—3 in FIGURE 1.
FIGURE 4 is a fragmentary diagrammatic cross-sectional view of an alternative form of the apparatus shown in FIGURE 1.

FIGURE 1 generally depicts a cathode-ray tube having an envelope 10 including a neck 11 joined to a cone 12 terminating across its enlarged end in a faceplate 13. The shape is that which now is conventional for cathode-ray tubes utilized in television receivers. Disposed within neck 11 is a conventional electron gun assembly including a cathode 14, an intensity control grid 15 and beam forming electrodes 16, these elements together acting to project cathode-rays (an electron beam) toward faceplate 13.

Disposed externally around neck 11 adjacent to cone 12 is the conventional deflecting yoke 17 operative to deflect the cathode-rays back and forth across faceplate 13 in a series of horizontal lines successively displaced vertically so as to describe an entire image raster upon the faceplate. Other conventional components include a phosphor screen 18 on the inner surface of faceplate 13 and a conductive coating 19 substantially covering the internal surface of cone 12. Screen 18 is a phosphor responsive to the impinging cathode-rays to produce light and typically is overcoated with a thin layer of aluminum. Conductive coating 19 extends into contact with screen 18 at one end of the tube and into neck 11 at the other end. Cathode 14 is grounded as indicated and conductive coating 19, usually deposited in the form of a colloidal graphite mixture, is conductively connected to a terminal post 20 extending through cone 12 and in turn connected to a source of high-voltage positive potential HV+.

In operation, the high positive potential applied to coating 19 creates within cone 12, between the electron gun and screen 18, a field which accelerates the cathode-rays in their passage to the image screen. In the electron gun, the cathode-rays are modulated in accordance with the video image so that a television picture is developed over the image screen. This much is quite conventional and need not be further described herein.

Further included within envelope 10, in accordance with the present invention, is an element 22 which defines a needle-like point disposed in the high voltage accelerating field and having a potential sufficiently negative relative to that field potential as to cause cold-emission of electrons from the point. To this end, the element is in the form of a pointed conductive pin projecting through cone 12 at a position near the larger end of the cone. The point of pin 22 is disposed within the interior of the envelope, and generally faces screen 18. Externally of the envelope, pin 22 is connected to ground. Conductive coating 19, while substantially continuous over the internal surface of the cone, has an opening surrounding pin 22 so as to define a nonconductive area through which the pin projects.

Also included within envelyope 10 is a mask 24 of electron opaque material disposed between the point of pin 22 and screen 18. Cut through mask 24 is at least one electron transparent region; as here embodied, there are a series of such regions spaced along the height of mask 24 (FIGURE 2) and individually defining successive television channel numbers. As illustrated, mask 24 may be of an electrically conductive material like a color-selection mask and is supported from the adjacent portion of cone 12 by a metallic post 25 electrically connected to coating 19. Preferably also included in succession between pin 22 and mask 24 are a pair of stream-forming electrodes 26 and 27 in the form of conductive discs having apertures disposed on an axis between the pin 22 and mask 24. Electrode 27 is connected to a high-voltage potential source to serve as an anode and guide the electrons toward mask 24. In this case, electrode 27 is simply connected to coating 19 by a conductive spacer like post 25 in FIGURE 2, although in practice improved performance is obtained by operating mask 24 at a potential higher than that on anode 27; for this purpose, separate terminals like post 20 may be included for either or both of mask 24 and anode 27. Electrode 26 also is supported from the adjacent wall portion of the envelope although in this case it is insulated from coating 19 so as to operate at a much lower potential than that on anode electrode 27. Electrodes 26, 27 serve to form and guide electrons emitted from the point of pin 22 into a stream which is accelerated toward mask 24. If desired, lens electrode 26 may be connected to potential point intermediate that of pin 22 and anode 27 so that these three elements together act electro-optically as an ordinary convergent lens. Preferably, the aperture in electrode 26 is larger than that in anode 27.

The indicator system further includes means for creating between the point of pin 22 and mask 24 a field selectively variable so as to move the electrons emitted from the point to and away from the electron transparent regions in mask 24. To this end, an electromagnet 28 is disposed externally of and adjacent to the wall portion of envelope 10 on the inner side of which the space between anode 27 and mask 24 is located. Electromagnet 28 here takes the form of a U-shaped core 29 the free ends of which are disposed in a plane parallel to mask 24 and located between the latter and anode 27. The leg ends are disposed respectively on opposite sides of mask 24 so as to define a flux path 30 in which flux flows from one side to the other on the downstream side of the aperture in anode 27. Disposed on the bight of core 29 is a coil 32 having terminals as indicated connected to an adjustable source of direct current.

In operation, the high positive potential applied to coating 19 creates a corresponding field in the region within which the point on pin 22 is located. The latter, being at ground potential, or at least at a potential very low compared to the potential of source HV+, emits a copious supply of electrons by the phenomenon known as cold or field emission. A minor part of that emission is lost directly to coating 19 or is physically intercepted by electrode 26, but a significant portion thereof is drawn through the aperture in electorde 26 by the high potential on anode 27. Consequently, a stream of electrons is delivered through the aperture in anode 27 and directed to mask 24. This latter stream is deflected, up or down, with corresponding changes in the strength of flux 30 which, of course, is in turn a function of the level of direct current flowing in coil 32. Thus, adjustment of the level of that current enables the stream to be selectively deflected onto any one of the different transparent regions in mask 24 that define the respective channel numbers. When the stream impinges upon the area defining a given channel number, at least a portion of the electrons pass through that area and impinge upon the phosphor layer of screen 18 in a pattern determined by the shape of the channel-indicating opening in the mask. The result is the production of an image directly on the screen.

It usually is desired to have the television picture occupy at least almost all of the area of faceplate 13; that is, the entire volume of space with cone 12 preferably is swept by the cathode rays. As shown in FIGURE 1, the elements of the indicator system would limit the extent of vertical height because they are in a path to intercept cathode rays deflected over the top portion of screen 18. Such interference is avoidable by locating the indicator system, including pin 22 and mask 24, in other portions of envelope 10 so as to be out of the path of the cathode rays.

One embodiment exemplifying such an approach is shown in FIGURE 4 wherein envelope 10 is formed to have an outwardly projecting protuberance or chamber 34 in communication with and immediately adjacent to the volume of space within cone 12. Disposed within chamber 35 are pin 22, electrodes 26 and 27 and mask 24. These elements are supported from the walls of the chamber in the same manner as previously described and the principle of operation of the indicator is the same as before. As illustrated, however, mask 24 in this case is oriented with its long dimension horizontal. Correspondingly, electromagnet 28 is rotated about its axis of symmetry 90° with respect to the position shown in FIGURE 1 so as to cause its flux lines to flow generally in the vertical direction between mask 24 and anode 27. Changes in the current applied to coil 32 move the electron stream emerging from the aperture in anode 27 in a horizontal direction. As before, the electron image pattern emerging from the transparent region selected in mask 24 is allowed to fall upon screen 18 and thereby produce a pattern indicative of the channel number.

Of course, the level of current in coil 32 in the illustrated embodiments is controlled by the adjustment of the television tuner. While this may be accomplished in a number of different ways, it need include essentially nothing more than a potentiometer in series with the source of the current and arranged to be driven by the same movement which operates the tuner.

The particular embodiment of FIGURE 1 envisions location of the indicator system near one margin, and perhaps near a corner, of faceplate 13. By locating the principal elements of the indicator system further away from faceplate 13 as shown in FIGURE 4, a greater degree of magnification of the electron image formed by mask 24 is obtainable, permitting in turn a larger image of the channel number to be formed on screen 18. Moreover, the elements of the indicator system need not be aligned horizontally as illustrated; for example, protuberance 34 may have its axis canted so as to permit alignment of pin 22 and the other elements of the indicator system in a direction to project the electron image to a position centered on faceplate 13.

The approach exemplified in FIGURE 4, wherein the channel-indication image is formed over a substantial portion of screen 18, is suitable for use either by superimposing the channel-number image on the television image or by creating the channel image when the primary picture, formed by the cathode rays, is disabled. In the latter connection, such an indicator system is particularly adaptable to television receivers arranged for remote control operation. In that case, one of the remote control functions may include the feature of disabling the development of the cathode rays so that faceplate 13 is dark except for the image produced by the indicator system. This may occur, for example, by causing the conventional audio-mute operation of the remote control system also to darken or remove the video picture. Alternatively, the channel-tuning operation of the remote control system may include the function of turning off the video picture display as the tuner moves between channels, during which time the indication image is displayed. In a still different alternative, one particular control function of the remote control system may be assigned to block out a portion of the video picture image on screen 18 and leave an area of the screen available for production of the indication image when desired.

As depicted here for purposes of illustration, the different channel numbers in mask 24 are all of the same size and form factor. The development of projected images from the series of successively spaced numerals in mask 24 results in a variation of the ratio between the electron-source-to-mask distance and the mask-to-screen distance. This produces both differences in size and distortion of the indication images formed on the screen for at least some of the numbers. That is, if the centrally located number 7 as shown in FIGURE 2 is located directly in line with the apertures in electrodes 26 and 27, so that the electrons projected through the region defining the number 7 form a properly proportioned replica thereof on screen 18, then the images formed as the electrons are caused to traverse others of the numerals will be relatively distorted as to shape and relatively different as to size. As is well-known generally in the image projection art and even particularly in the light-projection-type television-channel-indicator systems, the different numeral-defining regions in mask 24 may be individually altered in shape in an inverse manner to compensate such distortion and change of image size. Since such compensation by means of compensating mask design is so well-known, it need not be discussed further herein.

The indicator systems disclosed herein are in one sense quite analogous to television channel-indication systems heretofore which project light through a mask that bears a number of light-transparent regions defining the different channel numbers. The systems herein, however, utilize the projection of electrons instead of light. Moreover, those electrons are produced without the need for any additional power-supply components since the energy required for the electron emission is obtained by utilizing a high-potential field already present in the cathode-ray tube. Similarly, the indicator image is formed on the phosphor screen which also already is present. The electron emitter is a simple and inexpensive needle-shaped element. By locating the indicator-system elements a sufficient distance from the image screen, the additional elements such as the stream-forming electrodes and the mask may be made very small, thus rendering their cost and the volume taken by them correspondingly small.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. In a cathode-ray tube having an envelope enclosing an image screen, means for projecting cathode-rays toward said screen and means creating a high-positive-potential field for accelerating said cathode-rays, an indicator system comprising:

means defining a needle-like point disposed in said field and having a potential sufficiently negative relative to the potential of said field to effect cold-emission of electrons from said point;

a mask of electron opaque material disposed between said point and said screen and having at least one electron transparent region therethrough;

and means for creating between said point and said mask a field selectively variable in strength to deflect electrons emitted from said point transversely of said mask to and away from said region.

2. In a cathode-ray tube as defined in claim 1, a system which further includes guiding means disposed between said mask and said point for directing said electrons toward said mask.

3. In a cathode-ray tube as defined in claim 2, a system which further includes means disposed between said guiding means and said point and together therewith defining a convergent electron lens.

4. In a cathode-ray tube as defined in claim 2, a system in which said guiding means is an anode biased at the potential of said field and having an aperture through which said electrons are drawn.

5. In a cathode-ray tube as defined in claim 1, a system in which said mask is located adjacent to said envelope and said creating means includes an element disposed externally of and adjacent to said envelope for developing said field.

6. In a cathode-ray tube as defined in claim 5, a system in which said element is an electromagnet.

7. In a cathode-ray tube as defined in claim 1, a system in which a conductive coating, substantially covering an internal surface area of said envelope intermediate said screen and said projecting means, defines a non-conductive area therein through which said point projects.

8. In a cathode-ray tube as defined in claim 1, a system in which said envelope defines a symmetrical volume substantially throughout which said cathode-rays are scanned and further defines a chamber immediately adjacent to and in communication with said volume and in which said point and mask are disposed.

References Cited

UNITED STATES PATENTS

| | | | |
|---|---|---|---|
| 2,271,990 | 2/1942 | Ramberg et al. | 313—336 X |
| 2,363,359 | 11/1944 | Ramo | 313—336 X |
| 3,082,341 | 3/1963 | Balaskovic | 315—13 X |

RICHARD A. FARLEY, *Primary Examiner.*

BRIAN L. RIBANDO, *Assistant Examiner.*